United States Patent
Shepodd

(10) Patent No.: US 7,001,535 B2
(45) Date of Patent: Feb. 21, 2006

(54) POLYMER FORMULATION FOR REMOVING HYDROGEN AND LIQUID WATER FROM AN ENCLOSED SPACE

(75) Inventor: Timothy J. Shepodd, Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 588 days.

(21) Appl. No.: 10/143,308

(22) Filed: May 10, 2002

(65) Prior Publication Data

US 2003/0213934 A1 Nov. 20, 2003

(51) Int. Cl.
 *H01K 1/56* (2006.01)
 *H01J 7/18* (2006.01)
 *H01J 35/20* (2006.01)

(52) U.S. Cl. .............................. 252/181.6; 252/181.1; 252/181.2; 252/181.7; 252/194; 252/184; 423/248

(58) Field of Classification Search ............. 252/181.6, 252/181.1, 181.2, 181.7, 194, 184; 423/248
See application file for complete search history.

(56) References Cited

U.S. PATENT DOCUMENTS

| | | | |
|---|---|---|---|
| 3,896,042 A * | 7/1975 | Anderson et al. ........... 252/184 |
| 3,963,826 A * | 6/1976 | Anderson et al. ........... 423/248 |
| 4,405,487 A * | 9/1983 | Harrah et al. ................ 252/194 |
| 4,512,721 A * | 4/1985 | Ayres et al. .................. 417/51 |
| 4,886,048 A * | 12/1989 | Labaton et al. ........ 165/104.27 |
| 5,408,832 A * | 4/1995 | Boffito et al. ................ 62/45.1 |
| 5,624,598 A * | 4/1997 | Shepodd et al. ....... 252/181.12 |
| 5,703,378 A * | 12/1997 | Shepodd et al. ....... 252/182.12 |
| 5,837,158 A * | 11/1998 | Shepodd et al. ......... 252/181.6 |
| 5,849,210 A * | 12/1998 | Pascente et al. ............... 252/3 |
| 6,063,307 A * | 5/2000 | Shepodd et al. ......... 252/181.6 |
| 6,110,397 A * | 8/2000 | Shepodd et al. ......... 252/181.6 |
| 6,200,494 B1 * | 3/2001 | Manini et al. ........... 252/181.7 |
| 6,322,724 B1 * | 11/2001 | Sanderson .................. 252/194 |
| 6,521,014 B1 * | 2/2003 | Toia et al. ..................... 75/245 |
| 6,589,444 B1 * | 7/2003 | Thomas et al. ............. 252/194 |

* cited by examiner

*Primary Examiner*—Joseph D. Anthony
(74) *Attorney, Agent, or Firm*—Timothy P. Evans

(57) ABSTRACT

This invention describes a solution to the particular problem of liquid water formation in hydrogen getters exposed to quantities of oxygen. Water formation is usually desired because the recombination reaction removes hydrogen without affecting gettering capacity and the oxygen removal reduces the chances for a hydrogen explosion once free oxygen is essentially removed. The present invention describes a getter incorporating a polyacrylate compound that can absorb up to 500% of its own weight in liquid water without significantly affecting its hydrogen gettering/recombination properties, but that also is insensitive to water vapor.

19 Claims, 3 Drawing Sheets

POLYMER FORMULATION FOR REMOVING HYDROGEN AND LIQUID WATER FROM AN ENCLOSED SPACE

STATEMENT OF GOVERNMENT INTEREST

This invention was made with Government support under government contract no. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

BACKGROUND OF THE INVENTION

The present invention pertains to methods for removing hydrogen from various atmospheres within enclosed spaces which also contain significant concentrations of oxygen. In particular, the invention pertains to the use of new organic polymer formulation for scavenging hydrogen which is also capable of absorbing liquid water formed as the result of the catalysis of hydrogen and oxygen.

In many applications the presence of hydrogen and its isotopes, arising from various chemical and electrochemical corrosion reactions, can be detrimental. The accumulation of hydrogen can present a significant fire and/or explosion hazard, particularly in sealed components. Mechanical and electrical safety devices, such as pressure relief valves, can be expensive, unreliable, and particularly for small devices, not always practical.

It has long been known that certain gas scavenging materials, (also known as getters), can be used to counteract the accumulation of hydrogen and/or oxygen within closes spaced. In U.S. Pat. No. 4,512,721, Ayers et al., discuss the use of active metals such as zirconium or titanium, and alloys thereof, for maintaining low hydrogen partial pressures but have the disadvantage of requiring high temperatures for initial activation and/or ongoing operation because of the necessity to diffuse surface contaminants into the bulk metal thereby providing a fresh surface for continued hydrogen absorption.

Labaton, in U.S. Pat. No. 4,886,048, describes another means for removing hydrogen by reacting the hydrogen with oxygen to form water (recombination), in the presence of a noble metal catalyst such as palladium, and trapping the water on a water absorbing material such as a molecular sieve. However, hydrogen getters of this type are expensive, bulky, limited by the availability of oxygen, and capable of causing a detonation if improperly formulated.

It is well known also that unsaturated carbon-carbon bonds (i.e., double and/or triple bonds between carbon atoms) can be reduced by hydrogen, in the presence of an appropriate catalyst, to form an alkane (see, for example, Fieser, L. F. and Fieser, M., Textbook of Organic Chemistry, D. C. Heath & Co. 1950, pp. 66–69 and 86). See also Anderson et al. (U.S. Pat. Nos. 3,896,042 and 3,963,826); and Harrah et al., (U.S. Pat. No. 4,405,487).

In particular, commonly owned U.S. Pat. Nos. 5,624,598, 5,703,378, 5,837,158, and 6,063,307 to Shepodd, et al., (the teaching of which is herein incorporated by reference in their entirety) describe hydrogen getter systems that utilize double and/or triple bonded organic polymer compounds mixed with a hydrogenation catalyst, typically a noble metal selected from New IUPAC Groups 9 and 10 of the Periodic Table of Element.

The Shepodd, et al., references teach that when these systems are exposed to hydrogen, the unsaturated carbon-carbon bonds are irreversibly converted to their hydrogenated analog with the aid of the associated catalyst. Hydrogenation of a carbon-carbon double bond in an organic compound by means of a catalyst, as illustrated in FIG. 1, is typically an irreversible, exothermic, heterogeneous reaction. That is, hydrogenation (the addition of hydrogen to at least one unsaturated carbon-carbon bond) takes place at the boundary between the catalyst and the organic reactant. Consequently, in order to achieve the highest degree of effectiveness, the getter materials should preferably be prepared using techniques that ensure that the catalyst is in reactive association with the unsaturated carbon-carbon bonds of the organic reactant compound.

The heterogeneous nature of organic hydrogen getters causes a distribution of reaction sites that react at different rates. While in principle, the getter will not stop reacting until all the unsaturated bonds have been hydrogenated, in practice, the rate becomes vanishingly small as the getter approaches saturation. Furthermore, in order for hydrogenation of an unsaturated carbon-carbon bond to take place in an organic hydrogen getter it is necessary not only that the hydrogen gas but also the catalyst that mediates the reaction be proximate the unsaturated bond(s). Thus, in addition to ensuring that the catalyst is distributed as uniformly as possible throughout the organic hydrogen getter, it is necessary to provide for movement of the organic getter molecules such that as many as possible of the unsaturated bonds in the organic molecule are brought into effective contact with the catalyst. While this is relatively easy to accomplish for small organic molecules it is extremely difficult for long chain polymer molecules.

Shepodd, et al., however, discovered that by employing long chain organic polymer molecules having a low glass transition temperature ($T_g$), such as polybutadiene and its co-polymers, it was possible to formulate an organic hydrogen getter that possesses a high capacity for hydrogen absorption as well as a high hydrogenation efficiency. Having a low $T_g$ endows the polymer molecules with fluid-like properties that permit movement of the polymer molecule itself, thereby bringing unsaturated bonds in the molecule into proximity with the catalyst to provide for hydrogenation of the unsaturated bond. Furthermore, lower weight polymer chains that can move more rapidly to a catalyst site demonstrate enhanced reactivities.

These prior art organic hydrogen getters and recombiners have shown themselves to be effective at removing hydrogen to trace levels in the presence of other gases within protected volumes. However, when oxygen is present, a competition is set up between the direct gettering of hydrogen (hydrogenation of carbon-carbon multiple bonds) and the catalytic recombination of hydrogen with oxygen to form water.

While these getter formulations are not generally affected by water formation, the surrounding elements of the apparatus protected by the getter may be adversely affected by liquid water. This is a particular problem in semi-open systems or voluminous containers where there is a large potential for liquid water formation because of the amount of oxygen present. Water vapor up to 100% humidity is not generally a problem; however, liquid water, even if it is formed as a vapor that then condenses as the result of temperature and/or pressure fluctuations, or prolonged recombination, can cause corrosion, electrical shorts or transport of hazardous materials within the protected volume. The presence of liquid water is, therefore, detrimental to the function and structure of many protected volumes.

Finally, other recombiners have been described that absorb the water onto desiccants proximate, or commingled, with the reactant species. These materials are distinct from the present invention because the desiccants utilized in these previous compositions will also absorb water vapor from the air and, therefore, can become saturated without ever contacting liquid water. The present invention only absorbs water as a free liquid. Finally, should these prior art compositions encounter sufficient quantities of liquid water to submerge the getter, the reaction rate of the getter is dramatically reduced, becoming limited by the diffusion rate of hydrogen through the water layer.

What is desired, therefore, is a polymer formulation comprising a long chain organic molecule having a plurality of unsaturated carbon-carbon bonds. It is also desirable that the polymer formulation exhibit a high efficiency for removing hydrogen and oxygen, is relatively inexpensive and readily available, and is capable of absorbing liquid water and still function as an effective getter for hydrogen and oxygen.

SUMMARY OF THE INVENTION

It is an object of this invention, therefore, a novel composition for maintaining low partial pressures of hydrogen.

It is another object of this invention to provide a method for ensuring uniform controlled reaction between the organic reactant and hydrogen, particularly in the presence of oxygen.

It is still another object of this invention to provide a composition for absorbing liquid water formed as the result of a hydrogen-oxygen catalyzed reaction.

It is yet another object of this invention to provide an organic hydrogen getter system that includes an inert constituent operating as both a diluting medium for lessening the thermal effects of the catalyzed reaction between hydrogen and oxygen and for subsequently providing a passive heat sink by absorbing liquid water formed by the reaction.

It is another object of this invention to provide a hydrogen getter composition comprising organic polymers containing carbon-carbon double bonds throughout their structures intimately mixed with an insoluble supported noble metal catalyst composition, and with an acrylic acid polymer capable of absorbing liquid water.

It is yet a further object of this invention to provide a hydrogen getter composition that preferably comprises polybutadiene, polyisoprene, polybutadiene/polystyrene copolymers and derivatives thereof.

It is still another object of this invention to provide a hydrogen getter composition that utilizes a catalyst composition preferably comprising palladium supported on carbon, and wherein the acrylic acid polymer comprises sodium polyacrylic acid salt.

These and further objects, features and advantages of the invention will become apparent to those having skill in these arts from the following detailed description of the invention when taken together with the accompanying drawings and appended claims.

DETAILED DESCRIPTION OF THE INVENTION

Figure 1:
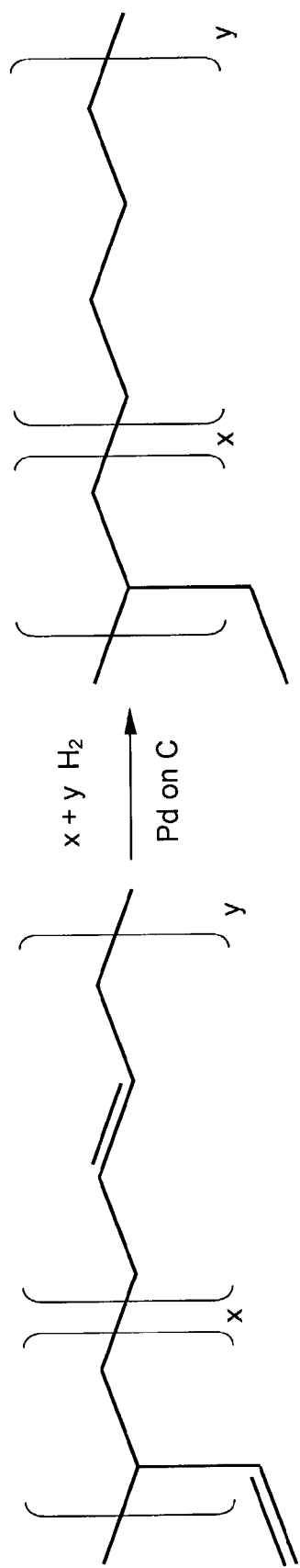
FIG. 1 illustrates the hydrogenation of a polymer molecule containing carbon-carbon double bonds.

This invention describes a solution to the particular problem of liquid water formation in hydrogen getters exposed to quantities of oxygen. Water formation is usually desired because the recombination reaction removes hydrogen without affecting gettering capacity and the oxygen removal reduces the chances for a hydrogen explosion once free oxygen is essentially removed. The present invention describes a getter that can absorb many times its own weight in liquid water (>>500%) without significantly affecting its hydrogen gettering/recombination properties, but that also is insensitive to water vapor. The composition disclosed herein comprises essentially a mixture that includes an unsaturated organic polymer, preferably polybutadiene, polyisoprene, polybutadiene/polystyrene copolymer, and derivatives thereof; a liquid water absorbing polymer such as polyacrylic acid, and the salts thereof (referred to hereinafter as a "polyacrylate" or the "polyacrylate constituent"); a supported noble metal catalyst, preferably platinum, palladium, rhodium, or combinations thereof dispersed onto an inert substrate such as carbon-black powders, ceramic oxides, mineral powders, salts and thixotropic agents and combinations thereof; and optionally one or more inert filler materials.

The formulation is prepared by blending the constituent materials together by milling them in an impact mixer particle reduction mill. In order to function properly the powders must be intimately blended to prevent the hydrophobic nature of the polybutadiene/carbon mixture from preventing water from readily contacting the polyacrylate constituent. In addition, the constituents may be mixed in stages to provide a precursor getter powder such as described in commonly-owned U.S. Pat. Nos. 5,703,378, 5,837,158 and 6,063,307 wherein the organic polymer, the supported hydrogenation catalyst, and the inert diluent are blended in a suitable solvent medium such as pentane, or petroleum ether dried to remove the solvent and then processed through a grinding mill into a powder. It is also possible to prepare the precursor getter by a "flash-freeze" process described in commonly-owned U.S. Pat. No. 6,110, 397, (herein incorporated by reference). In any case, it is critical to the present invention to provide a powdered blend as, homogeneous as possible, to provide the polyacrylate constituent an opportunity to function as intended as an absorber of liquid water.

It is well known that two reactions occur simultaneously during the course of hydrogenating the unsaturated bonds in an organic polymer when in the presence of both hydrogen and oxygen. One is the combination of hydrogen and oxygen in the presence of a catalyst to make water. The second is the hydrogenation of the carbon-carbon double bonds in the polymer. The relative rates of the two reactions change as the concentrations of the reactants and any bystander species change. In a closed space, one containing limited amounts of oxygen, the recombination reaction slows as the oxygen concentration decreases. When oxygen is gone, water production stops and direct gettering occurs until either the available hydrogen or the capacity of the getter is gone.

However, because reactions are both are highly exothermic, both have the potential to release sizable quantities of heat into their surroundings. Furthermore, it will be appreciated that hydrogen and oxygen can form explosive mixtures over a wide range of concentrations. If a means to control the reaction rate is not provided, such as that described in the present invention, an energy source such as a spark or a noble metal catalysts, especially when heated, can also initiate ignition.

The inventor has shown in commonly-owned U.S. Pat. Nos. 5,703,378, 5,837,158 and 6,063,307 that, in addition to their ability to react with hydrogen, the fluid polymers of these and those used in the present invention have an added advantage of mediating the rapid reaction between hydrogen and oxygen, in the presence of a catalyst, making a detonation unlikely. Furthermore, the polymer composition of the present invention allows for safe removal of hydrogen from $H_2/O_2$ mixtures because as liquid water is formed a polymer—water combination is also formed as the polyacrylate constituent, distributed as a powder throughout the polymer getter matrix, absorbs the water. This polymer—water combination has a higher heat capacity then the polymer alone and also provides a high enthalpy of evaporation due to the presence of the water. The getter composition is therefore able to absorb considerably more heat then it could otherwise absorb without the addition of the water.

Finally, in addition to functioning as an efficient hydrogen getter in hydrogen/oxygen atmospheres, the inventor has discovered that the hydrogen getters of the present invention also function efficiently to remove hydrogen from container having substantial quantities of water vapor. The inventor has found that the polyacrylate constituent does not absorb significant amounts of water vapor, even when at a relative humidity of 100% and therefore is not prematurely saturated limiting effectiveness for absorbing liquid water generated by the catalyzed $H_2/O_2$ reaction.

The most efficacious relative concentration of the unsaturated organic polymers and the polyacrylate is therefore subject to some interpretation based on the environment being protected. Too much of the polyacrylate constituent will obviously limit the rate and quantity of hydrogen that can be absorbed while to little might result in copious amounts of liquid water condensing on surrounding equipment. It has been found that concentrations of the polyacrylate constituent between about 1% to about 50% of the weight of the unsaturated organic polymer are effective in these applications.

Furthermore, the effective concentration of supported catalyst for optimum performance is found to be about 5% to 75% by weight of the associated polymer mixture where the supported catalyst composition itself comprises about 0.1% to 10% by weight of a highly dispersed noble metal such as platinum, palladium, or any of the other New IUPAC Group 8–10 metals found to be effective in catalyzing a hydrogenation reaction with unsaturated polymers such as polybutadiene, polyisoprene, polybutadiene/polystyrene copolymers and derivatives thereof.

The hydrogenation rate of the organic polymer of the present invention is typically further modified by adding an inert filler powders such as carbon blacks, ceramic powders, and various inorganic minerals in order to change the physical state of the compounded material. Such materials not only act as heat sinks they also allow the use to disperse the getter, aiding in flow of reactants and reaction products respectively to and from the getter surfaces.

Rate moderation is also possible by adding various functionalized substituents to the unsaturated polymer molecule. Functionalized substituents that cause crosslinking can slow the hydrogenation of the organic polymer. Such additional functionalized substituent groups can be selected from the group of materials consisting of hydrogen, $C_2$–$C_8$ alkenes, $C_2$–$C_8$ alkynes, $C_1$–$C_8$ ether, $C_1$–$C_8$ alcohol, $C_1$–$C_8$ ester, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid, and phenyl. As long as the polymer retains sufficient molecular mobility to provide reactive association between the polymer unsaturated bonds and the hydrogenation catalyst during hydrogenation, these additions have no adverse effect on either the capacity or efficiency of gettering.

The present invention is now more fully described by way of an example illustrative of the invention. This invention, however, may be embodied in many different forms and should not be construed as limited to the embodiment set forth herein.

EXAMPLE

The getter described by this invention is formulated from a blend of polybutadiene and polyacrylate (in this case, sodium polyacrylic acid salt) that is efficiently mixed with a precious metal catalyst and other inert materials. By way of example: about 6.9 grams of a polybutadiene-polyacrylate blend having a weight ratio of about 5:2, was mixed with 1.9 grams of 5% palladium on carbon, and 11.2 grams of inert carbon black.

Prior to mixing, however, the polyacrylate is processed in order to comminute the granular "as-received" stock material into a fine, talc-like powder. This is done by passing it through a hammer mill, or a high impact particle reduction mill commonly known as an "attritor", such as those machines manufactured by the Union Process Co. of Akron Ohio. Additionally, the remaining constituents comprising the prior art hydrogen getter composition are also premixed. In particular, the butadiene polymer used in the present invention is classified as a "low" molecular" weight polymer, meaning that it has an average molecular weight ($M_W$) of less then about 10,000, and a viscosity of about 1000 cPs to about 500,000 cPs. However, when the polymer, catalyst and inert diluent (carbon black) are properly mixed in a particle reduction attritor mill, the process yields a free-flowing black powder. This powder is mixed with the polyacrylate powder to yield the getter formulation of the present invention.

Figure 2:
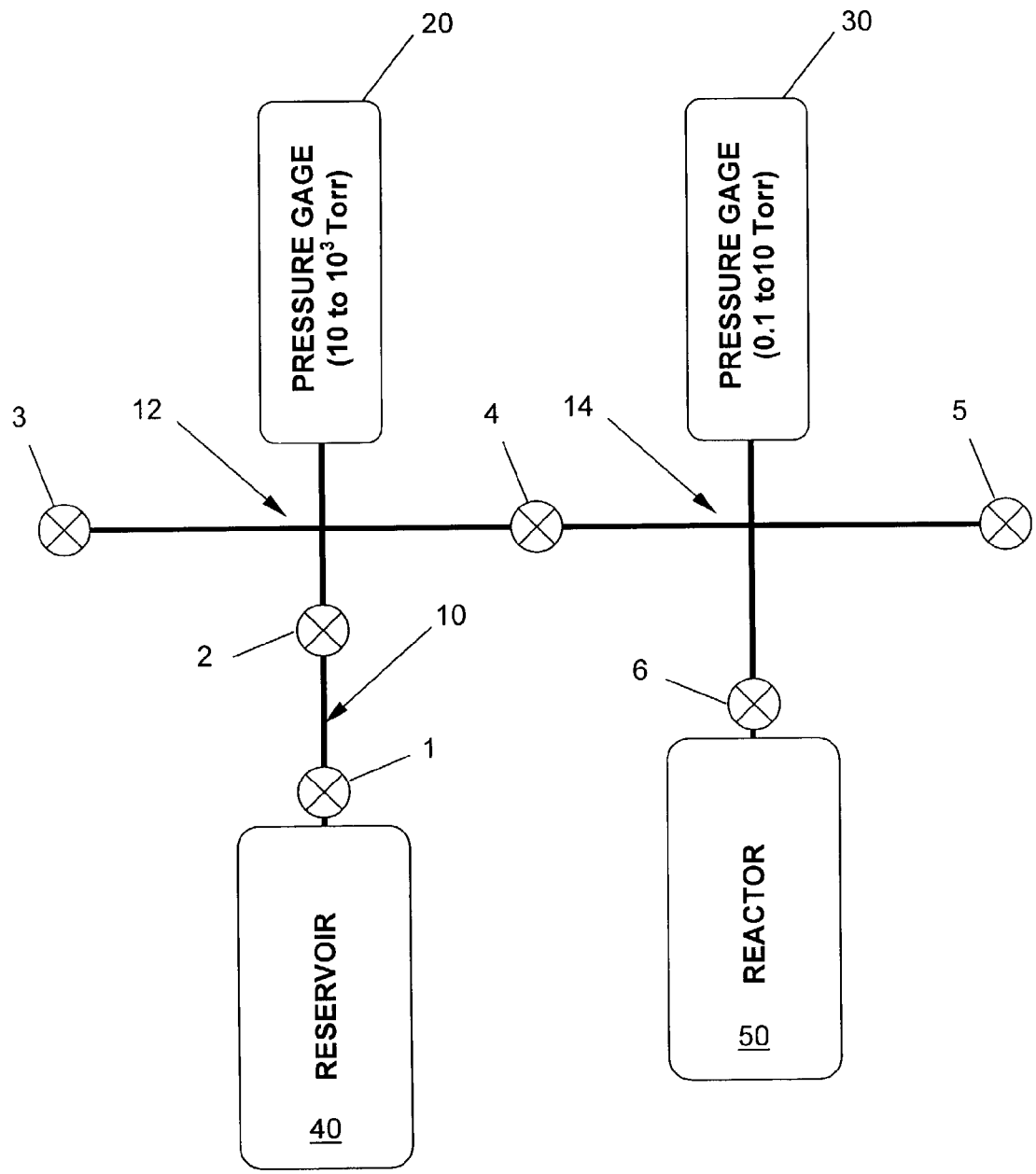
FIG. 2 illustrates a schematic diagram of a typical gas transfer vessel used to measure the getter rates of the compositions of this invention.

It is important to emphasize that the getter formulation of the present invention must be thoroughly mixed in order to function properly. Thorough mixing prevents the hydrophobic character of the polybutadiene polymer and the surface tension of water of polymer/carbon black mixture from blocking liquid water from contacting the polyacrylate. As an example, about 1 gram of the 20 gram sample getter formulation described above was placed in the reactor apparatus of FIG. 2. With getter sample in reactor vessel 50 and valve 1 on hydrogen gas reservoir 40 closed, a vacuum line (not shown) is attached at valves 3 and 5, and valves 2, 3, 4, 5 and 6 are opened so that lines 10, 12, and 14, pressure gages 20 and 30, and reactor 50 are evacuated. Valves 3, 4 and 5 are then closed and valve 1 opened so that lines 10, and 12 are filled with 980 torr of hydrogen gas. Valves 1 and 2 are then closed and valves 4 and 6 opened exposing the getter to the an atmosphere of hydrogen.

Figure 3:
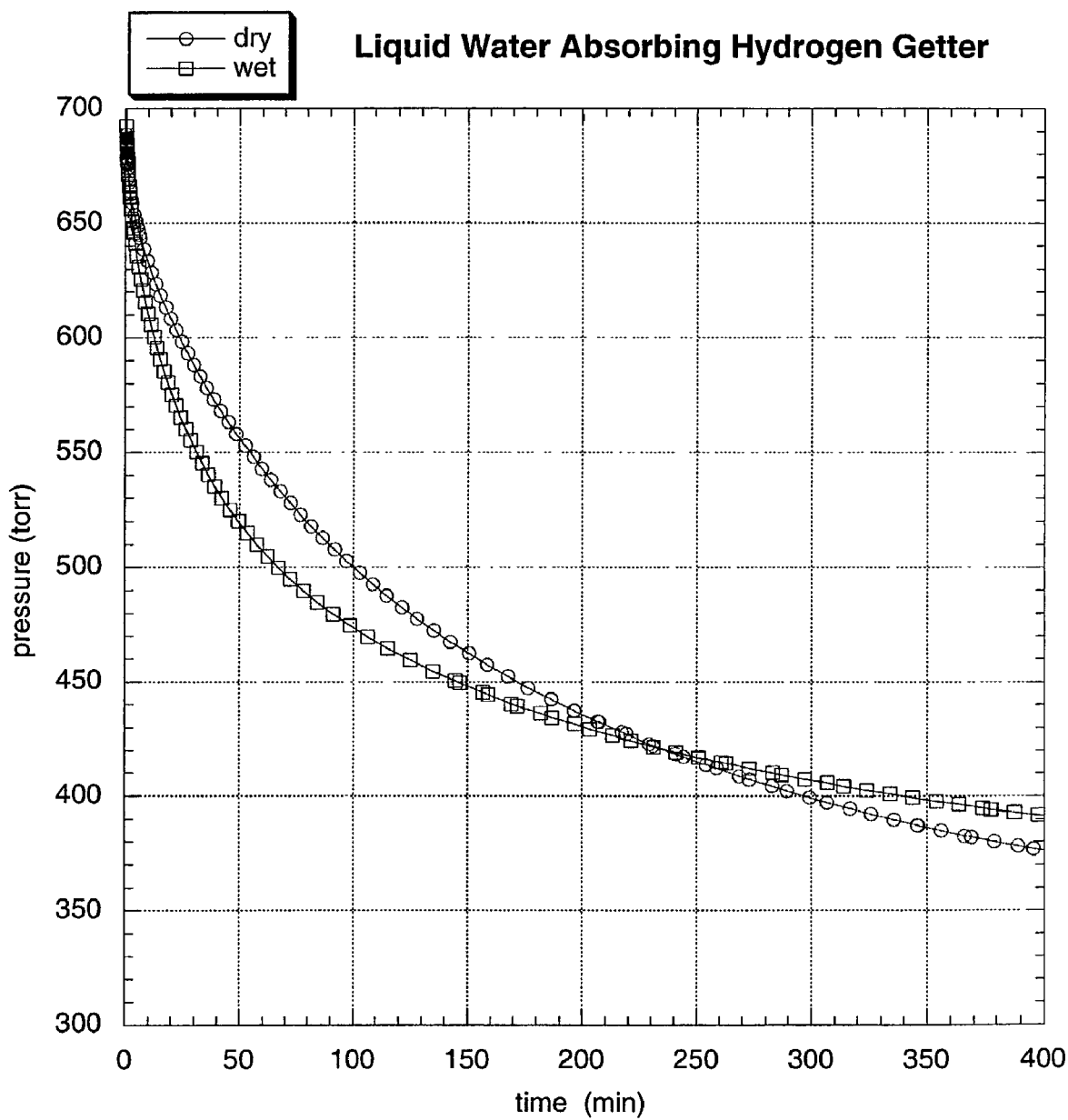
FIG. 3 shows the hydrogen absorption behavior of the present invention both before and after having absorbed a quantity of liquid water equivalent to 140% of the mass of the polyacrylate constituent. No apparent effect on hydrogen absorption is observed.

FIG. 3 shows the behavior of the getter in response to hydrogen exposure when the getter powder is in a dry, first state and when it is in a "wet," second state. The "wet" state was created by placing enough liquid water on the getter sample surface to initially cover and saturate the top, and most of the bulk, of the sample. The getter absorbed 1.4 grams of liquid water in this example (about 10× the weight of the polyacrylate).

This "wet" mixture was then exposed to the hydrogen gas, as before. As can be seen from the absorption curve relating to the "wet" mixture, the presence of the water has no significant effect on the ability of the getter to remove hydrogen. The hydrogen uptake curves are nearly equivalent as seen in FIG. 3 even though the water-exposed getter had absorbed nearly 1.5 times its weight in liquid water. This is demonstrative evidence that water is actually absorbed by the polymer formulation of the present invention since if the water remained had simply wetted the powder mixture and entered into the interstitial spaces between powder particles the water would have blocked gas transport of hydrogen to the particle surfaces and markedly slowed the measured uptake of hydrogen. Because the two curves appear virtually identical one is left with the conclusion that the water did not effect hydrogenation.

Finally, polymer hydrogenation was quantified using Nuclear Magnetic Resonance (NMR) analysis which confirms that about 78% of the sample was hydrogenated, again demonstrating that all or nearly all of the hydrogenation getter participated in gettering hydrogen and not just the small portion that remained dry.

From the foregoing description and examples, one skilled in the art can readily ascertain the essential characteristics of the present invention and recognize that the objects of the present invention are fulfilled. In particular, while only one composition is expressly described those having skill in these arts will realize that many different formulations covering a wide range of compositional ratios of the disclosed constituent materials is in fact possible.

What is claimed is:

1. A hydrogen getter composition for removing hydrogen and liquid water formed as the result of a hydrogen/oxygen catalysis, comprising:
    an organic polymer having unsaturated carbon-carbon bonds;
    a hydrogenation catalyst distributed throughout said getter composition wherein said hydrogenation catalyst is in reactive association with said unsaturated carbon-carbon bonds; and
    a liquid water absorbing polyacrylate distributed throughout said getter composition, for absorbing liquid water.

2. The hydrogen getter composition of claim 1, wherein the organic polymer is selected from the group consisting of polybutadiene, polyisoprene, polybutadiene/polystyrene copolymer, and the cured or crosslinked versions thereof and combinations thereof.

3. The hydrogen getter composition of claim 2, wherein said organic polymer comprises a plurality of repeating monomer units, said units having up to six side branches, said side branches further comprising $C_1$–$C_8$ alkyl that contain or are substituted with one or more functionalities selected from the group consisting of $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid, such that each said monomer unit contains at least one carbon-carbon double bond.

4. The hydrogen getter composition of claim 1, wherein said hydrogenation catalyst comprises:
    a noble metal catalyst for catalyzing a reaction between the unsaturated carbon-carbon bonds of the organic polymer and hydrogen, and
    a catalyst support material.

5. The hydrogen getter composition of claim 4, wherein said hydrogenation catalyst is selected from the group consisting of palladium, platinum, rhodium, and combinations thereof.

6. The hydrogen getter composition of claim 4, wherein said catalyst support material comprises a porous, inert solid.

7. The hydrogen getter composition of claim 6, wherein the porous, inert solid is carbon black, aluminum oxide or barium carbonate and combinations thereof.

8. The hydrogen getter composition of claim 4, wherein the concentration of said hydrogenation catalyst has a concentration in said hydrogen getter composition of about 5 weight percent to about 75 weight percent of the weight of said hydrogen getter composition, and wherein said hydrogenation catalyst contains a noble metal catalyst having a concentration of about 0.1 weight percent to about 10 weight percent of the weight of the hydrogenation catalyst.

9. The hydrogen getter composition of claim 1, further including inert additives.

10. The hydrogen getter composition of claim 9, wherein the inert additives are selected from the group consisting of carbon black powder, ceramic oxides, mineral powders, salts and thixotropic agents and combinations thereof.

11. A hydrogen getter composition for removing hydrogen from within an enclosed space, comprising:
    an organic polymer, said organic polymer further comprising a plurality of repeating monomer units, said units having up to six side branches, said side branches further comprising $C_1$–$C_8$ alkyl that contain or are substituted with one or more functionalities selected from the group consisting of $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid such that each said unit contains at least one carbon-carbon double bond;
    a hydrogenation catalyst consisting essentially of a noble metal catalyst and an inert catalyst support material, said hydrogenation catalyst distributed throughout said hydrogen getter composition wherein said double bonds and said noble metal catalyst are in reactive association;
    an inert diluent, said diluent selected from the list consisting of carbon black powders, mineral powders, salts, thixotropic agents and combinations thereof; and
    a liquid water absorbing polyacrylate distributed throughout said hydrogen getter composition.

12. The hydrogen getter composition of claim 11, wherein the noble metal catalyst is palladium or platinum.

13. The hydrogen getter composition of claim 11, wherein the concentration of said hydrogenation catalyst in said getter composition is from about 5 to about 75 weight percent hydrogenation catalyst, and wherein the hydrogenation catalyst contains about 0.1 to 10 weight percent of the noble metal catalyst, based on the weight of the hydrogenation catalyst.

14. The hydrogen getter composition of claim 11, wherein the concentration of said inert diluent is less than about 95 weight percent of said getter composition.

15. A hydrogen getter composition, comprising:
at least one of a polymeric compound consisting of units described as:

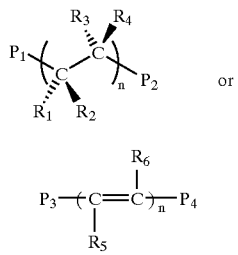

(I)

or (II)

wherein:

$R_1$–$R_6$ may be the same or different and comprise hydrogen, or $C_1$–$C_8$ alkyl that contain or are substituted with one or more functionalities selected from the group consisting of hydrogen, $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid, wherein at least one of $R_1$–$R_4$ contain at least one carbon-carbon double bond, and wherein the functionalities may be partially reacted together, thereby crosslinking some or all of the polymer compound of formula (I) or formula (II);

$P_1$–$P_4$ are terminal groups selected from the group consisting of hydrogen or $C_1$–$C_8$ alkyl that contain or are substituted with one or more functionalities selected from the group consisting of hydrogen, $C_2$–$C_8$ alkene, $C_2$–$C_8$ alkyne, $C_1$–$C_8$ ether, $C_1$–$C_8$ alcohol, $C_1$–$C_8$ ester, phenyl, $C_1$–$C_{10}$ anhydride, $C_1$–$C_8$ isocyanate, $C_1$–$C_8$ ketone, $C_1$–$C_8$ epoxide, and $C_1$–$C_8$ carboxylic acid; and n is from 5–10000;

a hydrogenation catalyst consisting essentially of a noble metal catalyst and an inert catalyst support material, said hydrogenation catalyst distributed throughout said hydrogen getter composition wherein said double bonds and said noble metal catalyst are in reactive association;

an inert diluent, said diluent selected from the list consisting of carbon black powders, mineral powders, salts, thixotropic agents and combinations thereof; and a liquid water absorbing polyacrylate distributed throughout said hydrogen getter composition.

16. The hydrogen getter composition of claim 15, comprising both said polymeric compounds described by said formula (I) and said formula (II).

17. The hydrogen getter composition of claim 16, wherein the noble metal catalyst is palladium or platinum.

18. The hydrogen getter composition of claim 16, wherein the concentration of said hydrogenation catalyst in said getter composition is from about 5 to about 75 weight percent hydrogenation catalyst, and wherein the hydrogenation catalyst contains about 0.1 to about 10 weight percent of the noble metal catalyst, based on the weight of the hydrogenation catalyst.

19. The hydrogen getter composition of claim 16, wherein the concentration of said inert diluent is less than about 95 weight percent of said getter composition.

* * * * *